Patented Jan. 30, 1951

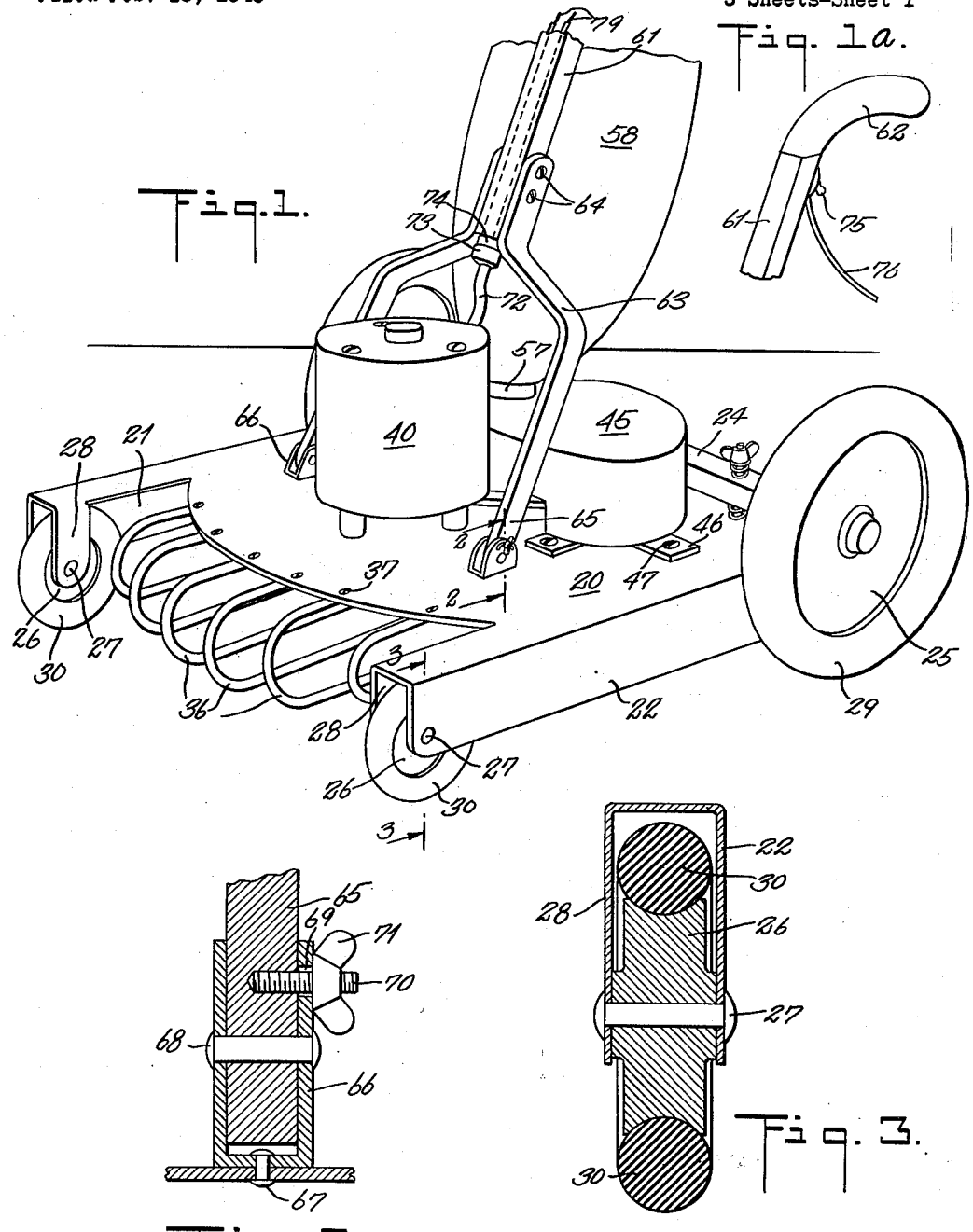

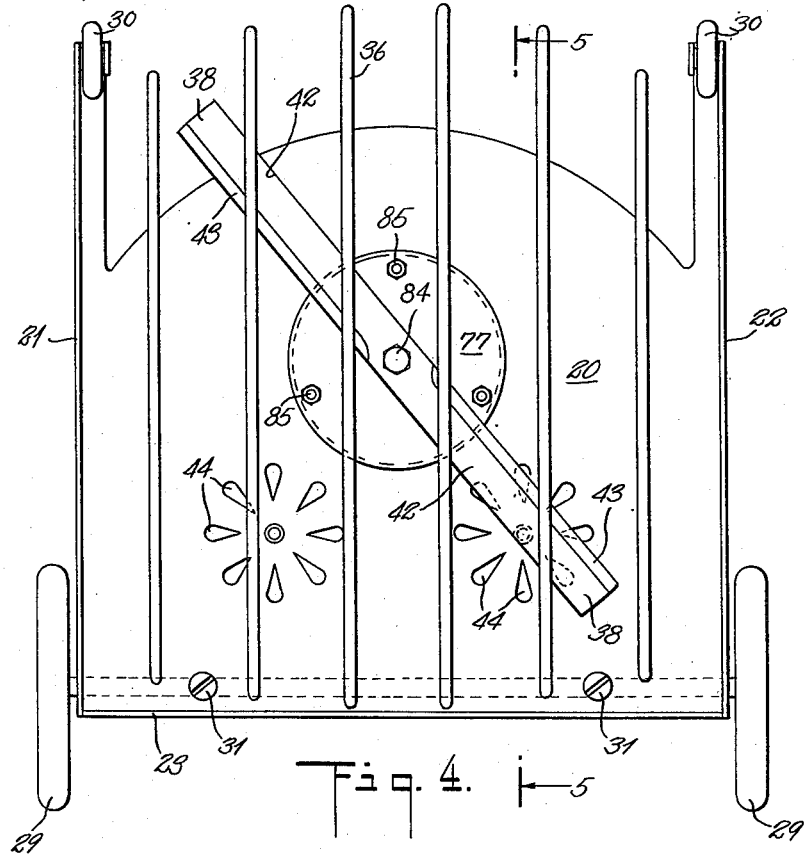
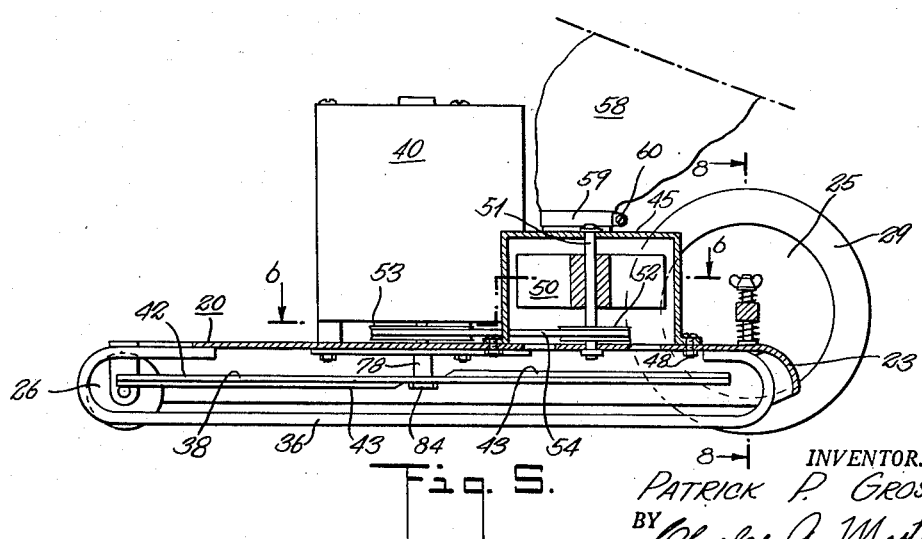

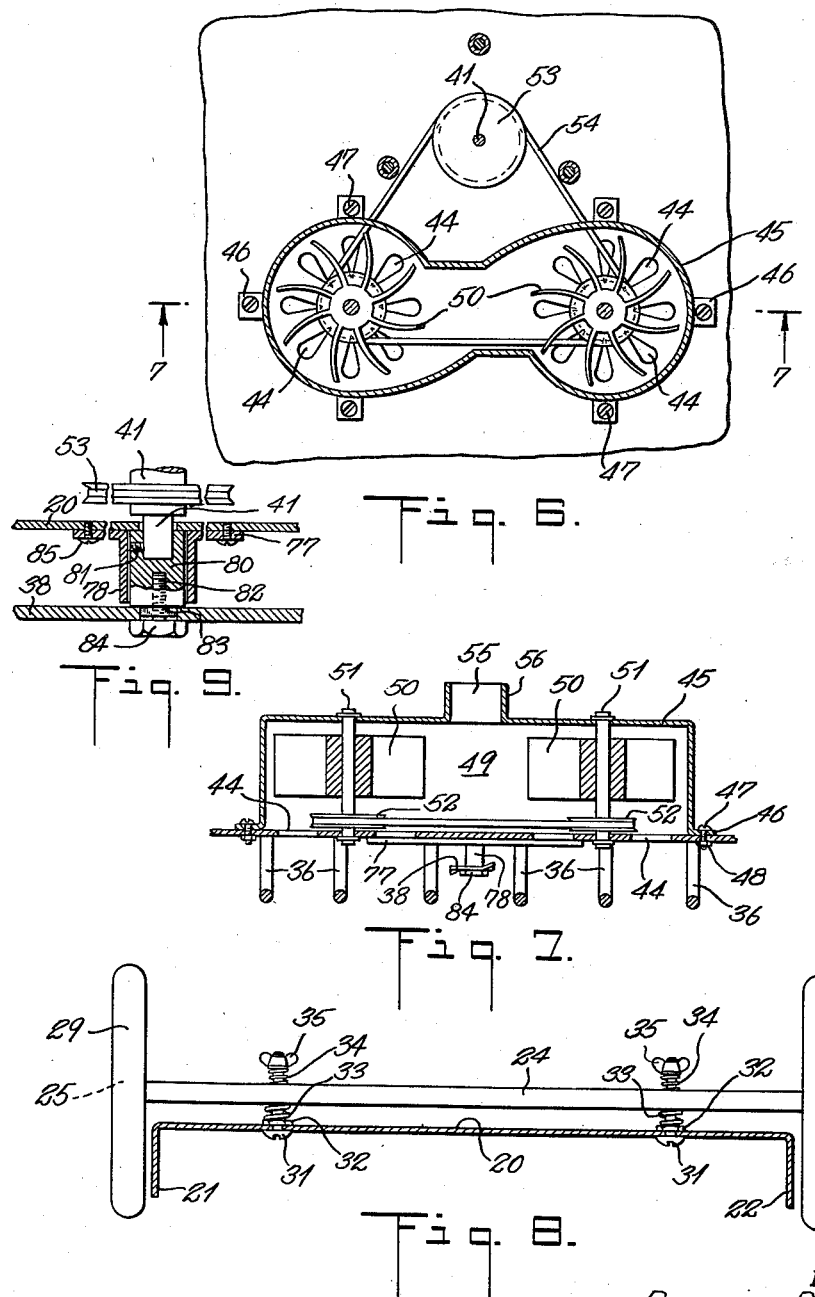

2,539,779

UNITED STATES PATENT OFFICE 2,539,779

ROTATING CUTTING DISK TYPE POWER MOWER

Patrick P. Grosso, Brooklyn, N. Y.

Application February 18, 1948, Serial No. 9,060

1 Claim. (Cl. 56—25.4)

This invention relates to improvements in lawn mowers, and more particularly to power-operated lawn and weed mowers.

One object of this invention is a lawn mower for cutting to any predetermined height or level, tall grass or tough weeds which have grown too high to be mown with the conventional lawn mower.

Another object is a power mower which can be readily adjusted to regulate the cut.

Another object is a lawn mower that will trim the lawn and cut down tall grass and tough weeds to any desired level all in one operation, thereby eliminating the use of a scythe or sickle, and avoiding extra work.

Another object is a power mower which is substantially noiseless, relatively light in weight, which operates similarly to a vacuum cleaner, and which can be readily operated with only one hand.

Another object is to protect the lawn against damage by the cutting blade of the mower such as the uprooting of the grass, or the digging of holes when the ground is uneven or irregular in contour.

Another object is to protect the cutting blade against injury from contact with stones or other foreign bodies or debris.

Another object is to protect the operator against injury from flying stones and the like or from contact with the rotating blade in any position of the mower.

Another object is to raise the thin blades of grass into an erect position for cutting.

Another object is a power mower which utilizes suction to remove the grass cuttings.

Another object is a power mower of but few and simple parts which is easy to manufacture, readily assembled, which can be sold at a low cost, and which is very efficient and durable in use.

Other objects will appear from the detailed description which follows:

In the drawings comprising three sheets of ten figures, numbered Figs. 1 and 1a to 9, inclusive, one suggested embodiment of the invention is shown.

Fig. 1 is a perspective view of the mower with the handle and certain other parts partially broken away;

Fig. 1a is a fragmentary view of the mower handle;

Fig. 2 is a sectional view of a detail taken along the line 2—2 of Fig. 1, looking in the direction of the arrows;

Fig. 3 is a vertical cross-sectional view of a front wheel assembly taken along the line 3—3 of Fig. 1, looking in the direction of the arrows;

Fig. 4 is an upset view of the overturned mower;

Fig. 5 is a vertical cross-sectional view taken along the line 5—5 of Fig. 4, looking in the direction of the arrows;

Fig. 6 is a horizontal cross-sectional view taken along the line 6—6 of Fig. 5, looking in the direction of the arrows;

Fig. 7 is a vertical cross-sectional view taken along the line 7—7 of Fig. 6, looking in the direction of the arrows;

Fig. 8 is a vertical cross-sectional view taken along the line 8—8 of Fig. 5, looking in the direction of the arrows; and Fig. 9 is a fragmentary cross-sectional view of a detail.

Like reference characters designate corresponding parts throughout the several figures of the drawings.

The mower includes a hood 20 made of some relatively light, strong metal, such as aluminum. The side and rear marginal edges of the hood 20 are downwardly bent to form the side flanges 21 and 22 and the rear flange 23. The side and rear flanges are deep enough in conjunction to form a skirt for arresting the progress of stones and debris which may be picked up and thrown outwards by the rotation of the rotary cutter 38.

The rear axle 24 is mounted upon the hood 20 by means of the threaded bolts 31, nuts 32, shock absorber springs 33 and 34 and wing nuts 35 (see Fig. 8). The distance between the axle 24 and the hood 20 can be regulated by varying the tension upon the wing nuts 35 and consequently upon the shock absorber springs 33 and 34. A pair of large wheels 25 are mounted to rotate on the axle 24 to form the rear wheels of the power mower. The wheels 25 are preferably provided with rubber tires 29 having suitably grooved treads. The front end of the hood 20 is also downwardly bent to form the ears 28 (see Figs. 1 and 3) which carry the front axles 27 whereon each front wheel 26 is rotatably mounted. The front wheels 26 may also be provided with suitably grooved rubber tires 30.

The hood 20, side flanges 21 and 22 and rear flange 23 in conjunction, form a skirted compartment or housing for a rotary cutter 38 which is mounted to revolve in a horizontal plane. A series of guard bars or runners 36 of substantially C-shaped construction, are secured beneath the hood 20 in any suitable manner as by spot welding or by the screws 37. The runners 36 are arranged in spaced relation to project forwardly from the front edge of the hood 20 in such a manner as to permit the tall grass or weeds to enter between the guard bars in an erect position, and to be retained in an erect position at two vertically spaced points by the upper and lower sections of the guard bars while being severed by the rotary cutter 38. The guard bars 36 by retaining the tall grass or weeds erect at two vertically spaced points in effect perform a double combing action upon the tall grass or weeds while at the same time serving as gliders or runners to support the mower parallel to the ground and glide the mower over any uneven spot in the lawn, thus preventing the rotary cutter 38 from cutting into the lawn and uprooting the grass, and protecting the rotary cutter from damage. The curved ends of the runners 36 allow the mower to be readily moved in either direction without injuring the lawn. The clearance between the curved ends of the runners 36 is sufficient to permit the rotary cutter 38 to revolve freely within the cage-like enclosure formed by the walls of the skirted lower housing and the C-shaped guard bars or runners 36.

A suitable prime mover 40, which may be an electric motor, is mounted in any desired manner above the hood 20 and the prime mover is so mounted that its main shaft 41 rotates on a vertical axis and extends through the hood 20 into the skirted compartment defined by the flanges 21, 22 and 23.

The rotary cutter is attached to the shaft 41 of the prime mover 40 in any suitable manner as by means of a bushing 80, so that the cutter 38 rotates with said shaft 41. The end of shaft 41 nests in bushing 80 (see Fig. 9) and is locked thereto by a suitable grub screw 81. The bushing is journalled in the collar 78 of a plate 77 which is secured to the hood 20 by means of the screws 85. The head of bushing 80 is squared at 83 to receive the square-holed hub of the rotary cutter 38. A machine screw 84 is fastened in the threaded opening 82. The head of the bushing 80 is spaced within the face of the rotary cutter 38. The face of collar 78 is spaced away from the other face of the rotary cutter 38 to reduce the risk of the grass whipping around the bushing 80.

The rotary cutter 38 includes a pair of elongated blades having their leading edge(s) 42 bevelled to define cutting edges, and their trailing edge(s) 43 angularly bent so that in rotating the blades create a suction which tends to lift the blades of grass into an erect position to facilitate the cutting action of the cutting edge(s) 42 of the rotary cutter 38.

The top of the hood 20 is provided with a series of intake openings 44 (Fig.4). A rotor housing 45 is attached to the top of the hood 20 above the intake openings 44 (Figs. 5 and 7) in any suitable manner, as by means of the flanged ears 46 and nuts 47 and bolts 48. The rotor housing 45 constitutes the upper wall of a chamber 49 which connects with the skirted compartment beneath the hood 20 via the intake openings 44. A pair of rotors 50 are mounted inside the chamber 49 upon the shafts 51 which are journalled to rotate in bearings formed by the wall of the rotor housing 45 and the upper face of the hood 20. The grooved pulleys 52—52 are keyed to the shafts 51, and the grooved pulley 53 is keyed to the motor shaft 41. The rotors 50 are driven from the shaft 41 of the prime mover 40 by means of the grooved pulleys 52—52, the V belt 54, and the grooved pulley 53 which is keyed to the shaft 41. The rotor housing 45 is provided with an outlet opening 55 having an upstanding peripheral flange forming a nipple or collar to which the restricted opening 57 of a refuse bag 58 may be detachably attached in any suitable manner, as by means of a clamp 59 and a nut and bolt 60.

The mower is provided with a handle bar 61 of suitable length and including the conventional hand grip 62. The handle bar 61 is pivotally mounted upon the hood 20 in any suitable manner as by means of a pair of metal angle brackets 63 which may be attached to the lower end of the handle bar 61 by means of suitable screws 64. The lower ends 65 of the brackets 63 are pivotally mounted upon the hood 20 in any suitable manner as by means of the spaced ears 66 and their studs 68.

Each spaced ear 66 (Fig. 2) is riveted at 67 to the hood 20 to form a U-shaped member for supporting a rivet or stud 68 whereon the lower end 65 of one of the angle brackets 63 is pivotally mounted. Each ear 66 is provided with a curved slot 69 to receive a male-threaded pin 70 which is also secured in the lower end 65 of the angle brackets 63. Each pin 70 carries a wing nut 71, so that by manipulating wing nut 71 upon the male-threaded pin 70, the angular position of the brackets 63 and of the handle bar 61 may be varied at the will of the operator, and the wing nuts 71 may be drawn tight to lock the brackets 63 in the angular position selected.

The prime mover 40 may be either an electric motor or a gasoline motor of suitable horsepower. When an electric motor is employed as the prime mover 40, a connecting cord 72 may be employed to furnish the necessary connection to a source of electric current. The cord 72 may pass through a central opening in the handle 61, and may be provided with a suitable plug 73, and with a socket 74 mounted in the lower end of the handle. A suitable control switch 75 may be mounted in the upper end of the handle to control the closure of the electric power circuit. An extension cord may be provided to extend the power circuit to a suitable outlet box connected with the permanent house circuit.

In operation, when the extension cord 76 is properly inter-connected with the power mower and the control switch 75 is closed, the electric motor 40 is actuated to drive the rotary cutter 38 and the rotors 50. As the mower travels across the area to be mown, the grass enters between the guard bars 36 which form spaced combs, the grass being raised into an upright position by the suction action of the trailing edge(s) 43 of the rotary cutter 38 and retained erect between the spaced combs, thus enabling the leading edge(s) 42 of rotary cutter 38 to sever the grass while it is held erect between the spaced combs.

The arms of the parallel evenly spaced guard bars 36, extend out beyond the front end of the mower like a series of fingers, which fingers act like the teeth of two combs placed one above the other, but separated by the space wherein the blade 36 rotates. As the mower is pushed forward, the tall grass and weeds enter between the teeth of the combs, and is cut down by the rotary cutter 36. The teeth of the combs hold the grass erect, while it is severed at any desired level as determined by the height adjustment of the axle 24 and the rear wheels 25. The parallel evenly spaced runners 36 which are a continuation of the looped ends run close to the ground and protect the lawn because no matter how uneven the lawn may be, the blade 36 can not cut below the set level or height for which the mower has been adjusted. In going over an embankment, a mound, or uneven ground, or when either wheel sinks in a rut or a soft spot, the guard bars 36 act as multiple runners and glide over the lawn, thereby avoiding the danger of digging up holes or uprooting tufts of grass.

The rotors 50 reduce the pressure in the chamber 49 below atmospheric thus drawing the short grass cuttings through the intake openings 44 of the hood 20 into the chamber 49, and then through the outlet opening 55 into the refuse bag 58.

By loosening the nut and bolt 60, the clamp 59 which clamps the refuse bag 58 to the collar 56, may be released and the refuse bag removed and emptied. The refuse bag 58 may then be reattached to the collar 56 and the mowing operation resumed.

When the mowing operation is completed, the control switch 75 is thrown to open position, and the plug of the extension cord 76 is disconnected from the socket of the outlet box.

When the prime mover 40 is an internal combustion engine, the control switch 75, connecting cord 72, plug 73, socket 74, and extension cord 76, are omitted.

What is claimed is:

In a power mower and in combination, a hood defining a lower housing, an upper housing mounted upon said hood, said upper housing and said hood in conjunction defining a chamber, openings formed in the upper and lower walls of said chamber, rotors mounted in said chamber, a series of guard bars, the opposite ends of each of said guard bars being upwardly and inwardly bent to form an elongated loop, the inner ends of said guard bars depending from said lower housing in horizontally spaced relation to define pairs of vertically aligned teeth, a cutter blade rotatably supported below said hood for movement between said rows of teeth in a plane substantially parallel to the ground, a prime mover mounted on said hood, a refuse bag, an opening in the lower end of said refuse bag, said refuse bag being connected with the opening in the upper wall of said chamber, said rows of teeth being operable to comb the grass and to maintain the grass erect until severed, and means mechanically coupling said prime mover to said cutter blade and to said rotors to sever the grass and draw the grass cuttings in an upward direction through the openings in the lower and upper walls of said chamber into said refuse bag.

PATRICK P. GROSSO

REFERENCES CITED

The following references are of record in the file of this patent:

UNITED STATES PATENTS

| Number | Name | Date |
| --- | --- | --- |
| 1,614,386 | Peebles et al. | Jan. 11, 1927 |
| 1,803,160 | Adams | Apr. 28, 1931 |
| 1,880,154 | Rotondo et al. | Sept. 27, 1932 |
| 1,899,564 | Frey | Feb. 28, 1933 |
| 2,154,564 | Eisenlohr | Apr. 18, 1939 |
| 2,167,222 | Shelor | July 25, 1939 |
| 2,225,139 | Urschel | Dec. 17, 1940 |